June 26, 1928.
L. R. RUTHENBURG
1,674,663
SWITCH MECHANISM
Original Filed Nov. 20, 1922    4 Sheets-Sheet 1
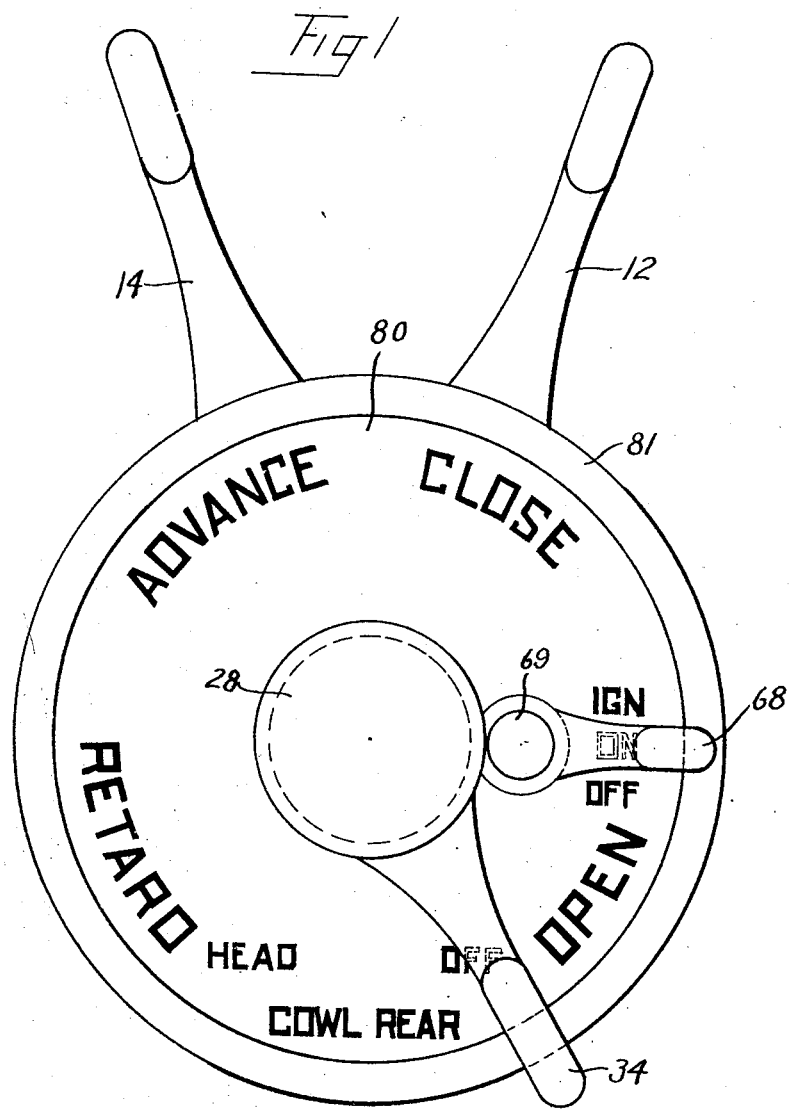
INVENTOR.
Louis R. Ruthenburg
BY
ATTORNEYS.

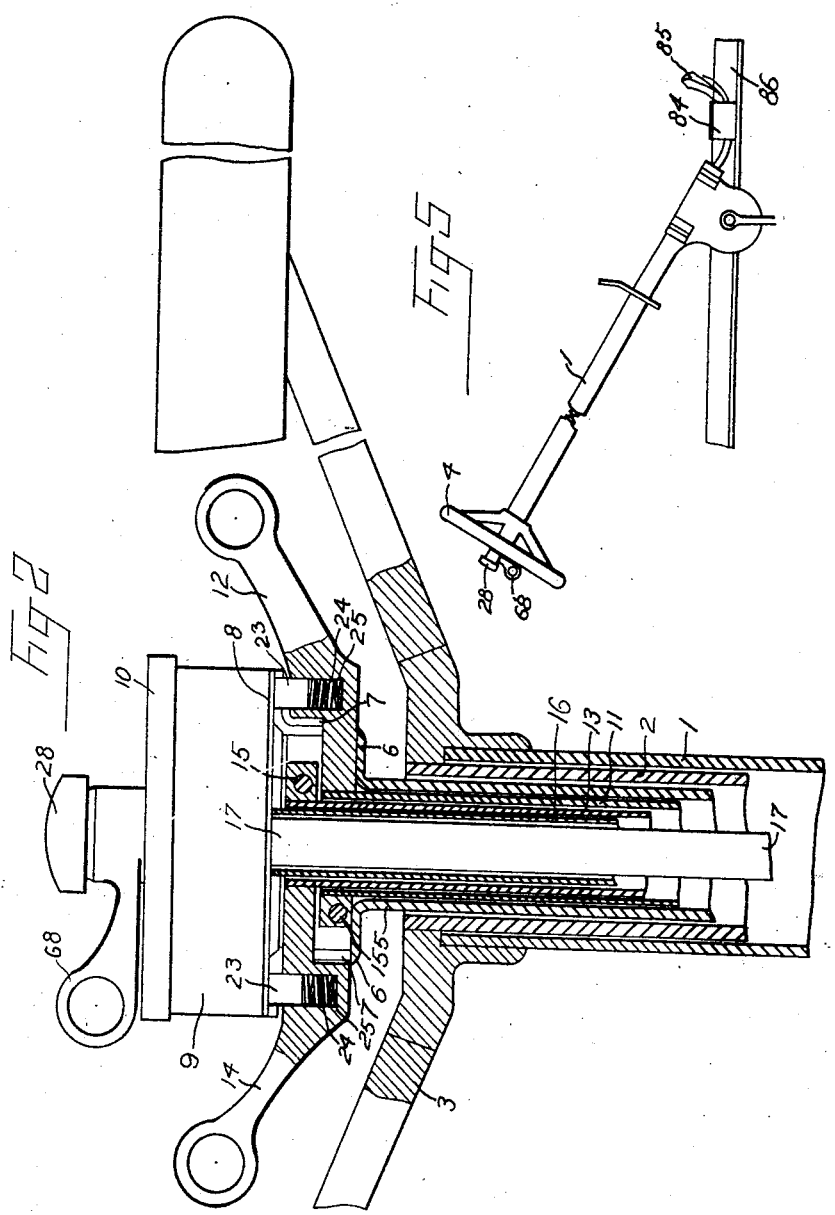

June 26, 1928.
L. R. RUTHENBURG
1,674,663
SWITCH MECHANISM
Original Filed Nov. 20, 1922  4 Sheets-Sheet 3
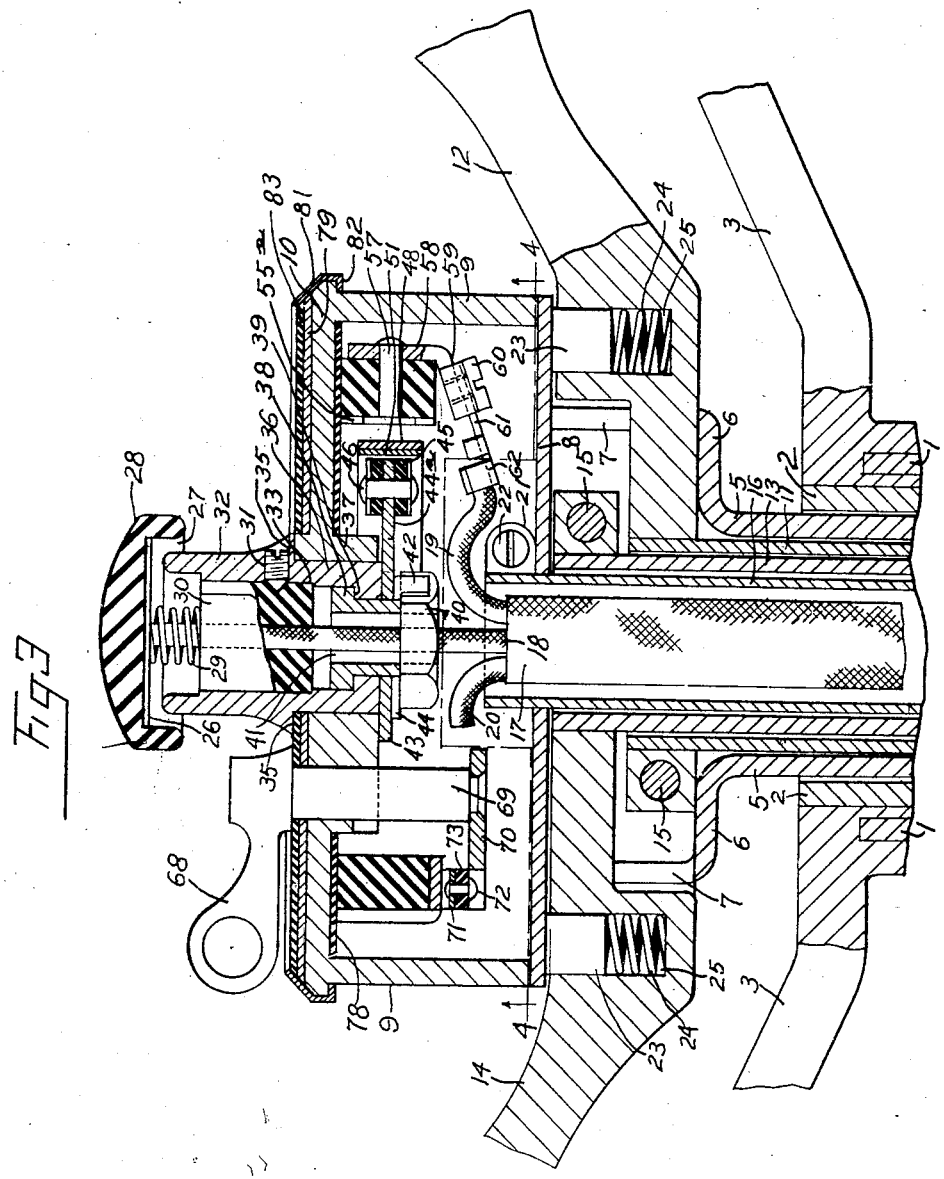
INVENTOR.
Louis R. Ruthenburg
BY
ATTORNEYS.

June 26, 1928.
L. R. RUTHENBURG
1,674,663
SWITCH MECHANISM
Original Filed Nov. 20, 1922    4 Sheets-Sheet 4
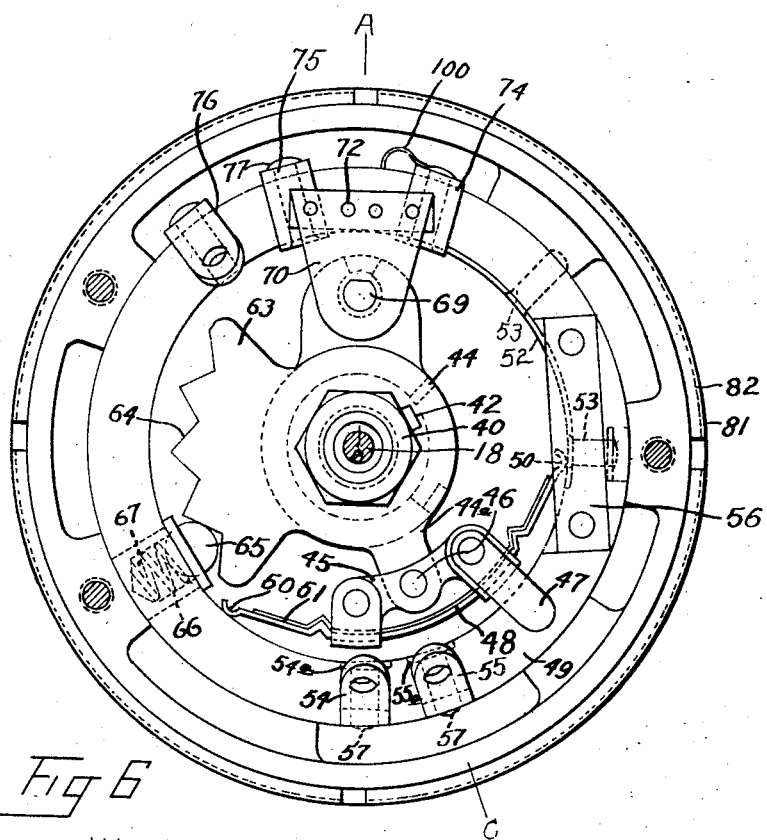
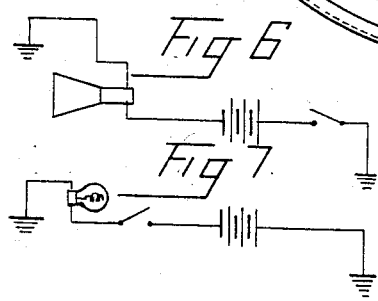
INVENTOR.
Louis R. Ruthenburg
BY
ATTORNEYS.

Patented June 26, 1928.

1,674,663

UNITED STATES PATENT OFFICE.

LOUIS R. RUTHENBURG, OF EAST MOLINE, ILLINOIS.

SWITCH MECHANISM.

Original application filed November 20, 1922, Serial No. 602,309. Divided and this application filed November 19, 1923. Serial No. 675,657.

My invention relates to switch mechanism and in particular to mechanism for controlling the operation of self propelled vehicles and is a division of my application Serial No. 602,309, filed November 20th, 1922.

It is an object of my invention to provide a switch which will be compact in form and positive in operation having a plurality of contacts mounted in a housing or box and controls located externally of such box carrying mechanism for making the desired connections with the contacts.

It is a further object of my invention to provide an insulating ring on which to mount a plurality of contacts, thereby leaving the center of the box or housing free for other purposes.

My switch mechanism may be used for various purposes but the drawings illustrate a construction particularly adapted for controlling the ignition, lights and horn of an automobile and which may be mounted centrally above the steering wheel. In this way the operator may manipulate the several controls without diverting his attention from the operation of the steering wheel.

Referring to the drawings:

Figure 1 is a plan view of the exterior of the steering wheel control box.

Figure 2 is a side elevation of the complete assembly of steering wheel and control box, with the steering wheel partially broken away, and the steering wheel support and associating tubular members in section, and parts of the control levers in section.

Figure 3 is a section on the line a—b—c of Figure 4, showing in detail the arrangement of the parts, conduits and the like, in the control box.

Figure 4 is a bottom plan view with the control levers removed and the cables eliminated in order to disclose the relative position of the several contacts. In order to disclose this mechanism, the bottom plate of the box has been removed.

Figure 5 is a side elevation of the steering column and junction box, illustrating diagrammatically the method of mounting the entire assembly of wires and manual controls on the chassis and steering column.

Figure 6 is a typical wiring diagram of the horn circuit.

Figure 7 is a typical wiring diagram of the lighting circuit.

Referring to the drawings in detail:

1 designates the steering column casing of tubular form. Within this casing is a tubular member 2 to which the spokes 3 of the steering wheel 4 are attached. This tubular member 2 is connected to the steering mechanism at the bottom of the column which may be of any desired character. Within the tubular member 2 is a third tubular member 5 that is bent outwardly, as at 6, at the top and upwardly, as at 7, to form a support for the bottom 8 of the switch box. This switch box is composed of side walls 9 and a top 10 preferably of a single piece of material such as a die casting.

Within the tubular member 5 is another tubular structure 11 which is attached to the throttle lever 12, which controls the supply of fuel for the engine. Within the fuel supply tube 11 is a fifth tube 13 which is attached to the spark control lever 14. The means of attachment of the lever 12 and 14 may be of any desired character such as a split collar, having a clamping bolt 15. The innermost tubular member is designated 16 and has its open upper end communicating with the switch box, and its lower end open for the exit of the cable and covering therefor, in a manner which will be hereinafter described. This cable covering is designated 17 and contains the horn, lighting and ignition cables which are generally designated respectively 18, 19 and 20.

The wiring tube 16 is held in position with reference to the switch box and its bottom 8 by a clamp 21 and clamping screw 22.

The arms 12 and 14 for the gas and spark control respectively carry spring pressed plungers 23 pressed outwardly by the helical springs 24 into yielding engagement with the bottom 8 of the switch box, thus positioning the levers as desired when released by the operator and maintained in that position until moved to a new position. The plungers 23 and springs 24 are contained in a chamber 25 located in the body of the respective arms 12 and 14.

Turning to the switch box, it will be seen that the cable for the horn, which cable is designated 18, is connected at its upper end to a contact plate 26, which is located in the bottom of the cup 27. This cup is located on the interior of the horn button 28. The horn button is of any desired insulating material such as bakelite and the like. The horn button is maintained in its uppermost position by the helical spring 29 which engages with the bottom of the cup or with the plate 26 at one of its ends and at the other rests upon an insulating support 30 which consists of a bakelite plug positioned by the set screw 31 in the projecting collar 32, which is mounted upon and seated in the top 10 of the switch box. The cable 18 passes through this insulating plug 30. The shoulder 33 on the interior of the projecting tubular member 32 also serves to support and position the plug 30.

It will be understood that this collar 32 also serves as a hub and is an integral part of the lighting control lever 34. This collar or hub has a shoulder 35 which determines the extent to which it projects into the switch box. The lower part of the hub projecting into the control box comprises a tubular member 36 bearing against a collar 37 carried by the top 10 of the switch box. A steel insert 38 is located within 36 and positioned therein by the shoulder 39 which forms a part of 36 and which engages the corresponding shoulder upon the insert 38. This steel insert being of stronger material than the die cast parts serves as the support upon which the retaining nut 40 is threaded. It will be understood that the cable 18 passes through an aperture 41 in both the steel insert and the nut 40. The nut 40 is prevented from rotation by the retaining finger 42. 43 designates the contact supporting plate mounted on this steel insert, while 44 is the lock washer to which the finger 42 is attached and of which it is an integral part. This plate 43 is preferably made of a steel punching, which carries a lug 44ª on one side. This lug 44ª supports a cross arm 45 which is pivotally attached thereto by the rivet 46, or by any similar means. This cross arm has means for supporting a contact plate 47 and a contact plate 48. This contact plate 48 rides on the inner wall of a ring 49 which is suspended from the top wall of the switch box. This ring is of insulating material and carries upon it a plurality of contacts. The contact plate 48 has a contact head 50 at each end thereof. It is backed by a tension spring 51 to maintain its contact heads 50 in yielding engagement with the interior wall of the ring 49 as the supporting arm 45 rocks with it on 44ª and in particular, in engagement with the contact strip 52, which is retained by the rivets 53 on the inner wall of the ring 49.

Mounted upon the outer wall of the ring 49 are the cable connections; the member 54 is connected to the cowl lights, 55 is connected to the head lights, and the contact plate 56 is connected to the tail light in circuit with which the instrument light is preferably included. The contact strip 52 is connected to the battery by means of a suitable wire 100 attached thereto. The battery is grounded and the remainder of the cable connections can be accordingly made, according to well known practice. It will be noted that the cable connections such as at 54, and 55 are so arranged that the contact plates 54ª and 55ª are on the inner wall of the ring 49, and are retained in position by transverse rivets 57 passing through the ring and clamping on the outside thereof, suitable cable connections consisting of plates 58 that are bent inwardly beneath the ring 49, as at 59. The clamp 60 secures the plate 61, which is connected to the cable 19, to the inwardly bent member 59 at 62. The other cables are likewise connected, and pass downwardly through the cable housing 17. Connected to the plate 43 is a projecting portion 63 having a plurality of teeth 64 on the periphery thereof the plate being segmental in shape. A ball 65 rides over these teeth and is held in engagement therewith by a helical spring 66 working in a socket or chamber 67 in the ring 49. This provides the necessary snap action to locate the parts in their respective positions.

Turning to the mechanism for controlling the ignition circuit (see Figures 3 and 4), it will be observed that there is a handle 68 provided for this control which has a shaft 69 which projects downwardly through the top 10 of the switch box. Carried by 69 is an arm 70 which has on its outer end a contact plate 71. This contact plate is mounted upon the arm 70 by rivets 72. The contact plate 71 is insulated from 70 by the insulating plate 73. 71 is adapted to span the gap between the contact plate 74, which connects with the battery and the ignition contact plate 75 which has its cable connected to the clamp 76. This plate 75 is retained on the ring 49 by the bolts or rivets 77.

It will be observed that the plate 71 will connect the battery plate to the ignition plate, or disconnect it as the lever 68 is moved from one position to the other. The cable 20 is connected to 76. This cable 20 is one of the cables that is located in the housing 17 within the wiring tube 16.

It will be understood that the under side of the top 10 of the switch box is provided with an insulating plate 78. The insulating ring 49 may be suspended from the switch box in any desired fashion.

The top of the switch box is provided with a cap plate 79 and a name plate 80, which carries the various legends which are necessary in such an arrangement. This name plate may be made of any desired material. It is retained in place by the ring 81, one flange of which, such as 82, engages the switch box, and the other flange, such as 83, engages the legend plate. It will thus be seen that I have provided in one unit on the top of the steering wheel closely adjacent the operator's hands and vision, all controls for the horn, ignition, lighting, spark, and fuel.

At the bottom of the steering column, is the flexible housing designated 17 through which the cables pass directly to a junction box 84, from which the various cables, such as 85, are conveyed to their respective parts of the engine. This junction box is preferably mounted upon an inner wall of the frame member of the chassis, such as 86. It will be observed that the body can be mounted upon the chassis, or moved without disturbing the wiring in any particular. I thus eliminate the body wiring, which is a long and tedious process that materially slows up production.

While I have shown and described certain features as constituting my invention, it will be understood that parts have been shown for purposes of illustration only, and that I do not desire to be limited to such details, as obvious modifications will occur to a person skilled in the art.

Having thus fully described my invention, what I claim as new and desire to secure by Letters Patent is:—

1. A new article of manufacture consisting of a control box, a ring adjacent the walls of said control box, a plurality of contacts, some located on said ring and others within said ring, and means pivotally located on said control box, extending into the interior thereof and joining the several contacts within the box to one another as desired.

2. A new art of manufacture consisting of a control box, a ring adjacent the walls of said control box, a plurality of contacts, some located on said ring and others within said ring, means pivotally located on said control box, extending into the interior thereof and joining some of said contacts within the box to one another as desired, a separate means controlled from the exterior of the box extending therein adapted to control other of said contacts within said box and cables connected to said contacts and adapted to be conveyed to a central point for their exit at the bottom of the box.

3. A new art of manufacture consisting of a control box, a ring adjacent the walls of said control box, a plurality of contacts, some located on said ring and others within said ring, means pivotally located on said control box, extending into the interior thereof and joining some of said contacts within the box to one another as desired, a separate means controlled from the exterior of the box extending therein adapted to control other of said contacts within said box means on the exterior of the box consisting of a contact plate and an insulating portion, a cable connected to said contact plate extending into the box, and means to yieldingly prevent the engagement of the contact plate with the box.

4. In a new article of manufacture, a control box for controlling the electrical equipment of a self-propelled vehicle, consisting of a box, an insulated ring mounted therein adjacent the walls thereof, a plurality of contacts carried by said ring, a lever mounted on said box having a hub extending thereinto, contact members carried by said hub within said ring for making and breaking contacts within said box, a second lever on the top of said box having a shaft extending into the interior thereof, a contact plate carried by said second lever and adapted to make contact with some of the contacts on the insulating ring, and means to maintain in position said first mentioned lever as it is moved from point to point.

5. In a new article of manufacture having a box, an insulating ring adjacent the walls of said box, a plurality of contacts on one surface of said ring connected to cables, a common contact on the inner surface of said ring, externally controlled means extending into the interior of said box carrying contact fingers adapted to bridge said contacts in pre-determined arrangements.

6. In a new article of manufacture having a box, an insulating ring adjacent the walls of said box, a plurality of contacts on one surface of said ring, a common contact on the inner surface of said ring, externally controlled means extending into the interior of said box carrying contact fingers adapted to bridge said contacts in pre-determined arrangements, one of said controlled means consisting of a lever and hollow hub, a horn button mounted above said hub and yieldingly maintained away from said hub, said button having a contact plate on the bottom thereof adapted to make contact with said hub, a cable passing through said hub and connected to said contact plate.

7. In a new article of manufacture having a box, an insulating ring, a plurality of contacts on one surface of said ring, a common contact on another surface of said ring, externally controlled means extending into the interior of said box carrying a contact finger adapted to bridge said contacts in pre-determined arrangements, one of said controlled means consisting of a lever and hollow hub, a button mounted above said hub and yieldingly maintained away from said hub, said button having a contact plate on the bottom thereof adapted to make contact with said hub, a cable passing through said hub and connected to said contact plate, the other of said controlled means having a shaft carrying a contact plate within the control box adapted to make contacts in pre-determined arrangements, and means for conveying cables connected to said contacts through the bottom of the box, as a unit.

8. In a control box consisting of side walls, a bottom and a top, an insulating ring mounted in said box adjacent the side walls, a plurality of contacts carried by said ring, a tubular hub mounted on the top projecting above the top, a handle adapted to rotate said hub, a bushing suspended in the bottom of said hub, a contact lever connected therewith within the box, a contact finger mounted thereon adapted to engage successively contacts carried on one face of said insulating ring, and another contact finger carried thereby adapted to make contact with a contact plate carried by the inner surface of said ring, whereby as the hub is rotated, successive contacts will be brought into operation.

9. In a control box consisting of side walls, a bottom and a top, an insulating ring mounted in said box adjacent the side walls, a tubular hub mounted on the top projecting above the top, a handle adapted to rotate said hub, a bushing suspended in the bottom of said hub, a contact lever connected therewith within the box, a contact finger mounted thereon adapted to engage successively contacts carried on one face of said insulating ring, and another contact finger carried thereby adapted to make contact with a contact plate carried by the inner surface of said ring, whereby as the hub is rotated, successive contacts will be brought into operation; a cable conveyed through the center of said hub and bushing, insulating means to position said cable, yielding means mounted thereon to support a contact plate above said hub, and a button mounted on said plate to enable the operator to bring the plate in engagement with the hub to make a circuit, irrespective of the position of the hub after it is rotated.

10. In a control box consisting of side walls, a bottom and a top, an insulating ring mounted in said box adjacent the side walls, a tubular hub mounted in the top and projecting above the top, a handle adapted to rotate said hub, a bushing suspended in the bottom of said hub, a contact lever connected therewith within the box, a contact finger mounted thereon adapted to engage successively contacts carried on one face of said insulating ring, and another contact finger carried thereby adapted to make contact with a contact plate carried by the inner surface of said ring, whereby as the hub is rotated, successive contacts will be brought into operation; a cable conveyed through the center of said hub and bushing, insulating means to position said cable yielding means mounted thereon to support a contact plate above said hub, and a button mounted on said plate to enable the operator to bring the plate in engagement with the hub to make a circuit, irrespective of the position of the hub after it is rotated; a second lever and shaft, the lever being on the exterior of the box and the shaft on the interior, a second series of contacts on the insulating ring, one of which is connected to the battery plate, and means carried by the shaft for making the connection between the battery plate and one of said contacts, and a cable connecting said contact with the mechanism to be controlled.

11. In a control box consisting of side walls, a bottom and a top, an insulating ring suspended in said box, a battery contact plate on the inner wall of said ring extending over a portion of its circumference, other contacts on the bottom of the ring, a centrally located, externally controlled arm adapted to move within said ring, a projecting contact finger carried by said arm for engaging one of the contacts on the bottom of the ring and a partially circular spring contact member carried by said arm adapted to engage with the battery plate on the inside of the ring.

12. In a control box consisting of side walls, a bottom and a top, an insulating ring suspended in said box, a contact plate on the inner wall of said ring extending over a portion of its circumference, other contacts on the bottom of said ring, a centrally located externally controlled arm adapted to move within said ring, a projecting contact finger carried by said arm for engaging one of the contacts on the bottom of the ring, a partially circular spring contact member carried by said arm adapted to engage the other contacts carried by the bottom of said ring and said plate on the inner wall of said ring, a rack carried by said arm and spaced therefrom, and means carried by the ring for yieldingly engaging the teeth of said rack and locating said contact finger, contact member and contacts successively in engagement with one another.

13. In a control box consisting of side walls, a bottom and a top, an insulating ring suspended in said box, a contact plate on the inner wall of said ring extending over a portion of its circumference, other contacts on the bottom of said ring, a centrally located externally controlled plate adapted to move within said ring, a projecting contact finger carried by said plate for engaging one of the contacts on the bottom of said ring, a partially circular spring contact member carried by said arm adapted to engage with the other contact members on the bottom of said ring and with said plate on the inside of the ring, a rack carried by said arm and spaced therefrom, means carried by the ring for yieldingly engaging the teeth of said rack and locating said contact finger, contact member and contacts in engagement with one another and yielding reinforcing means for maintaining the ends of the spring contact member in engagement with the inner surface of said ring.

14. In combination, in a control box, a ring therein of insulating material, a contact plate on the inside of said ring, a plurality of spaced contact members on other portions of said ring, a lever pivotally located within said ring having a cross arm, a partially circular spring contact member supported by the ends of the cross arm, said member having its ends engaging the inside of the ring, and a contact plate carried by one end of the cross arm for engaging one of the contact members on the ring.

15. In combination, in a control box, a ring therein of insulating material a contact plate on the inside of said ring, a plurality of spaced contact members on other portions of said ring, a lever pivotally located within said ring having a cross arm, a partially circular spring contact member supported by the ends of the cross arm, said member having its ends engaging the inside of the ring, and a contact plate carried by one end of the cross arm for engaging one of the contact members on the ring, a rack plate carried by said lever and a spring pressed ball carried by said ring and cooperating with the teeth on said rack plate to maintain the contacts in engagement with one another.

16. In combination, in a control box, a ring therein of insulating material, a contact plate on the inside of said ring, a plurality of spaced contact members on other portions of said ring, a lever pivotally located within said ring having a cross arm, a partially circular spring contact member supported by the ends of the cross arm, said member having its ends engaging the inside of the ring, and a contact plate carried by one end of the cross arm for engaging one of the contact members on the ring, a second lever located within said ring having a contact member sufficiently broad to engage specified contacts on said ring, one of which is connected to the contact plate on the inside of the ring and the other to an outgoing cable.

17. In combination, a control box, an insulating ring mounted therein, suspended from the bottom of the top of the box, a contact plate on the inside of the ring, a retaining means passing through the ring engaging a plate on the exterior thereof, which extends downwardly and laterally beneath said ring, a cable, a finger connected to said cable, and means to clamp said finger to said laterally extending means suspending from the ring.

18. A new article of manufacture consisting of a control box, a ring adjacent the walls of said control box, a plurality of contacts on said ring, and means pivotally located on said control box, extending into the interior thereof and joining the several contacts within the box to one another as desired.

19. A new article of manufacture consisting of a control box, an insulated ring adjacent the walls of said box, a plurality of contacts thereon, a flat contact spring suspended therein engaging with said ring, said spring being caused to take an arcuate form due to the pressure applied thereon in causing it to engage with said ring.

20. A new article of manufacture consisting of a control box, an insulated ring adjacent the walls of said box, a plurality of contacts thereon, a flat contact spring suspended therein engaging with said ring, said spring being caused to take an arcuate form due to the pressure applied thereon in causing it to engage with said ring, said contact member being pivotaly mounted to equalize the pressure thereof on said ring at either end.

21. A new article of manufacture consisting of a control box, an insulated ring adjacent the walls of said box, a plurality of contacts thereon, a flat contact spring suspended therein engaging with said ring, said spring being caused to take an arcuate form due to the pressure applied thereon in causing it to engage with said ring, said contact member being pivotally mounted to equalize the pressure thereof on said ring at either end, and means to insulate said contact member from its pivotal mounting.

22. A new article of manufacture consisting of a control box, an insulated ring suspended therein having a plurality of electrical contacts thereon, a contact member supported within said ring to engage with the contacts thereon, a detent member associated therewith for positioning said contact member, said detent member being located within said control box.

23. A new article of manufacture consisting of a control box, an insulating ring within said box, a plurality of contacts thereon, a rotating element within said ring and cooperating contact members carried on said rotated member within said ring adapted to engage with said contacts on said ring.

24. A new article of manufacture consisting of a control box, a ring adjacent the walls of said control box, a plurality of contacts thereon within said ring, a sliding contact member for engaging with said contacts, means to tension said contact member and means to equalize the tension on said contact member.

25. A new article of manufacture consisting of a control box, a ring adjacent the walls of said control box, a plurality of contacts thereon within said ring, a sliding contact member for engaging with said contacts, means to tension said contact member and means to equalize the tension on said contact member, and means to insulate said contact member from its operating mechanism.

26. In a control box, an insulating ring, a plurality of contacts thereon on one portion thereof, terminal clips connected to said contacts on the end portion thereof between the ring and said box, and cables connected to said terminal clips adapted to pass between said ring and said box to a centrally located exit.

27. In combination, a control box, a plurality of spaced inwardly extending supporting members on the interior thereof, an insulating ring carried thereon spaced at intervals from said box, contact members thereon, terminal clips connected thereto extending into the spaces between said ring and said box and a centrally located contact member for engaging said contacts on said ring whereby the cables connected to said terminals may be connected between the ring and said box in the spaces therebetween so that said terminal clips are protected and insulated.

In testimony whereof, I affix my signature.

LOUIS R. RUTHENBURG.